Figure 1:
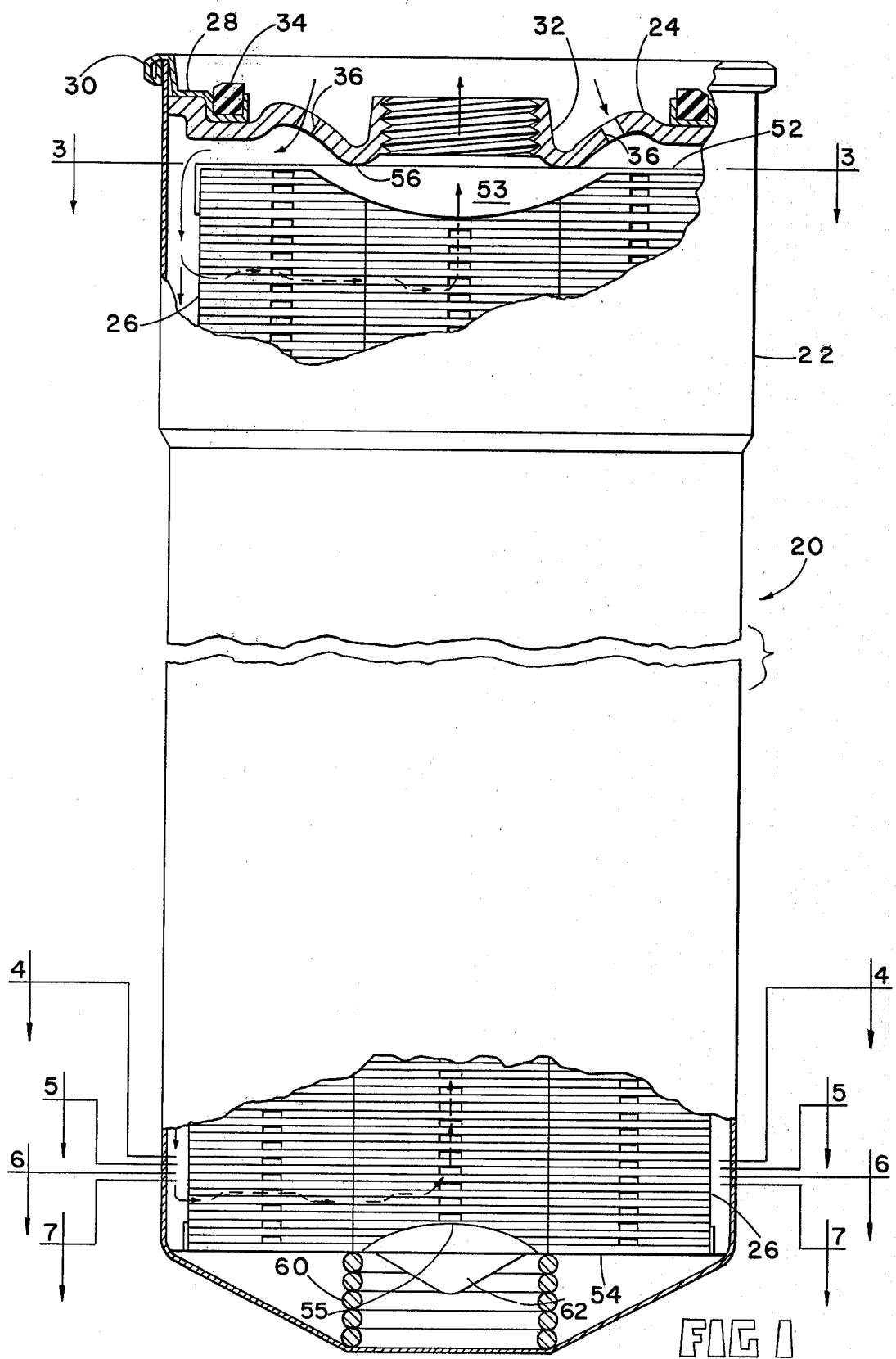

United States Patent [19]

Jensen

[11] 4,334,994
[45] Jun. 15, 1982

[54] DISPOSABLE FLUID FILTERS

[75] Inventor: Richard V. Jensen, Cookeville, Tenn.

[73] Assignee: Fleetguard, Inc., Columbus, Ind.

[21] Appl. No.: 970,731

[22] Filed: Dec. 21, 1978

Related U.S. Application Data

[63] Continuation-in-part of Ser. No. 865,544, Dec. 29, 1977, abandoned.

[51] Int. Cl.³ .............................................. B01D 25/02
[52] U.S. Cl. .................................. 210/336; 210/343; 210/444; 210/489
[58] Field of Search ................. 210/323 R, 336, 339, 210/343, 443, 444, 488, 489, 492, DIG. 17

[56] References Cited

U.S. PATENT DOCUMENTS

| | | | |
|---|---|---|---|
| 2,359,475 | 10/1944 | Gauthier | 210/488 X |
| 2,836,302 | 5/1958 | Buckman | 210/488 X |
| 2,856,076 | 10/1958 | Whipple | 210/492 X |
| 3,425,563 | 2/1969 | Wilansky | 210/492 |
| 3,481,472 | 12/1969 | Petri | 210/492 X |
| 3,690,460 | 9/1972 | Lindboe | 210/443 X |

FOREIGN PATENT DOCUMENTS 817906 10/1951 Fed. Rep. of Germany ...... 210/488

Primary Examiner—William A. Cuchlinski, Jr.
Attorney, Agent, or Firm—Edmund S. Lee, III

[57] ABSTRACT

A disposable, oil filter cartridge is described. The cartridge comprises a shell of circular outline within which a stack of interconnected filter discs of octagonal outline are held in preloaded, compressed condition by an end cap attached to the outer, or open, end of the shell. The stack of filter elements has a plurality of tortuous passageways through which oil flows and is discharged, after filtration, centrally of the stack of filter elements, through the end cap. A compression spring maintains the integrity of the tortuous passageways which might otherwise be lost due to the expected reduction in thickness of the filter elements during use. A second embodiment of the invention illustrates a similar cartridge in which the filter discs are of hexagonal outline which facilitates their fabrication from a sheet of filter material.

6 Claims, 16 Drawing Figures

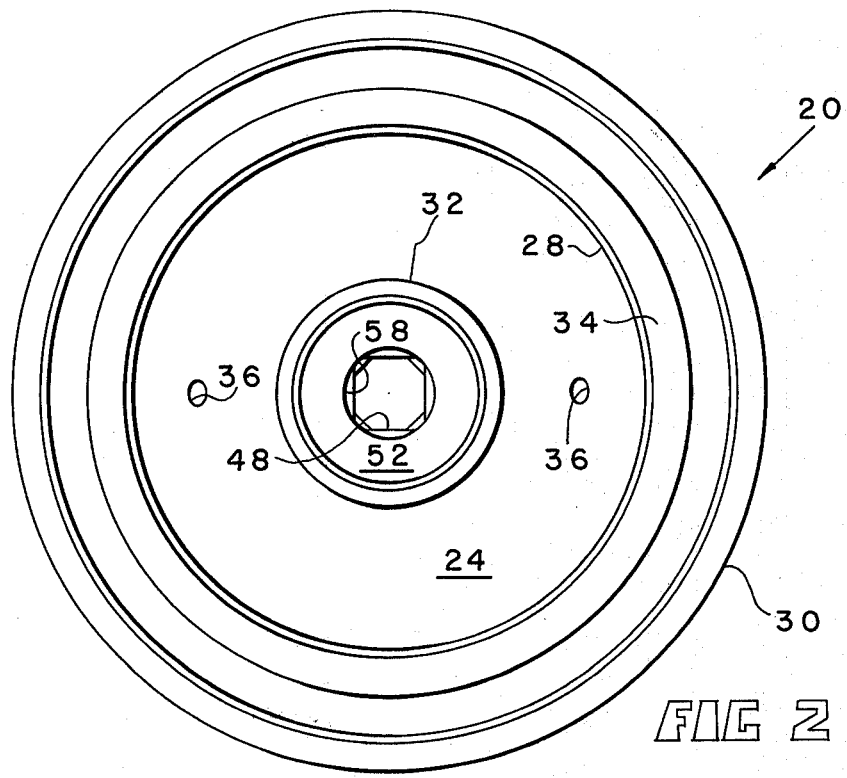
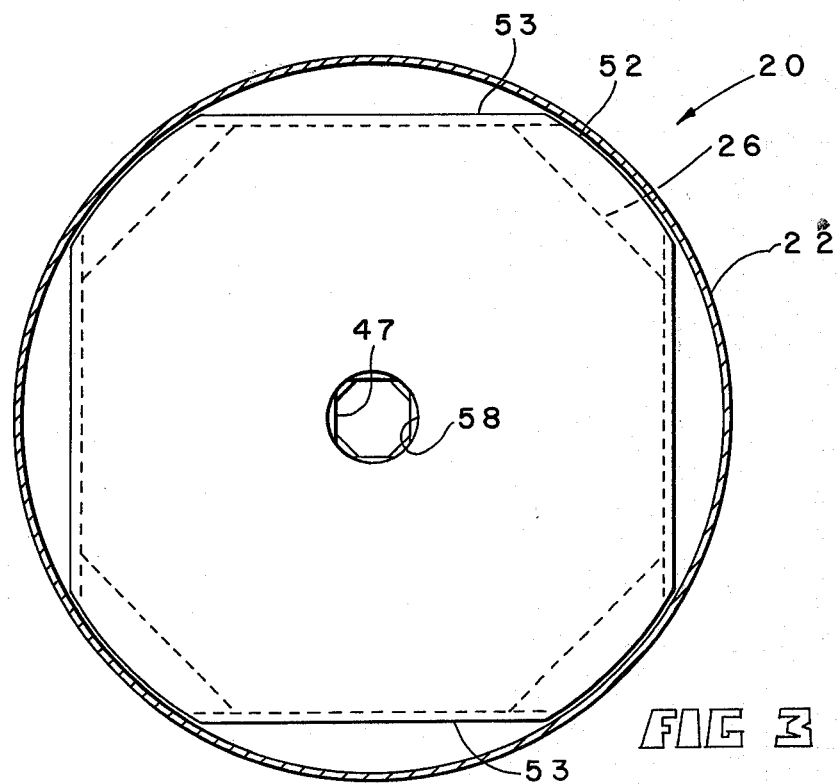

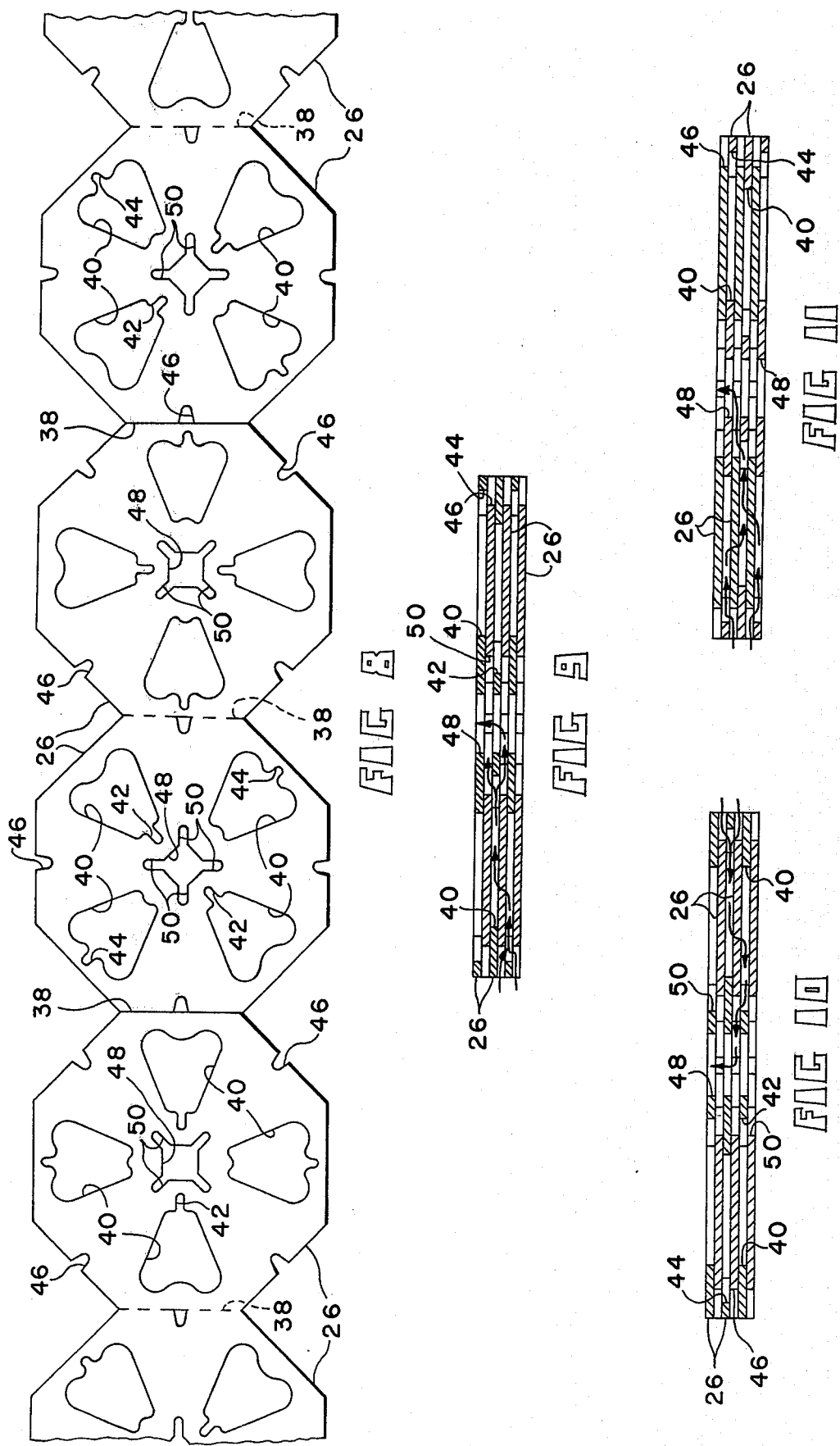

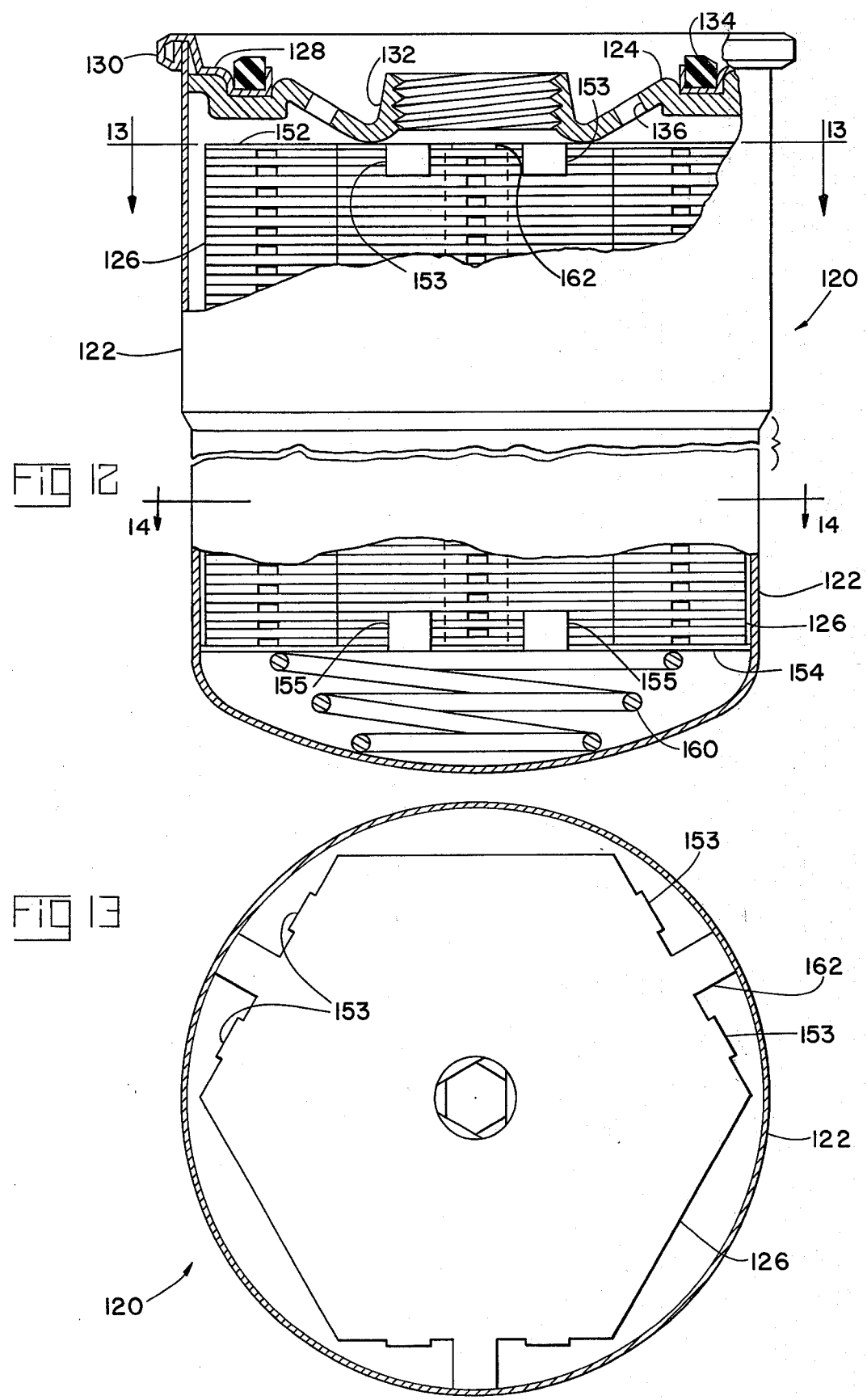

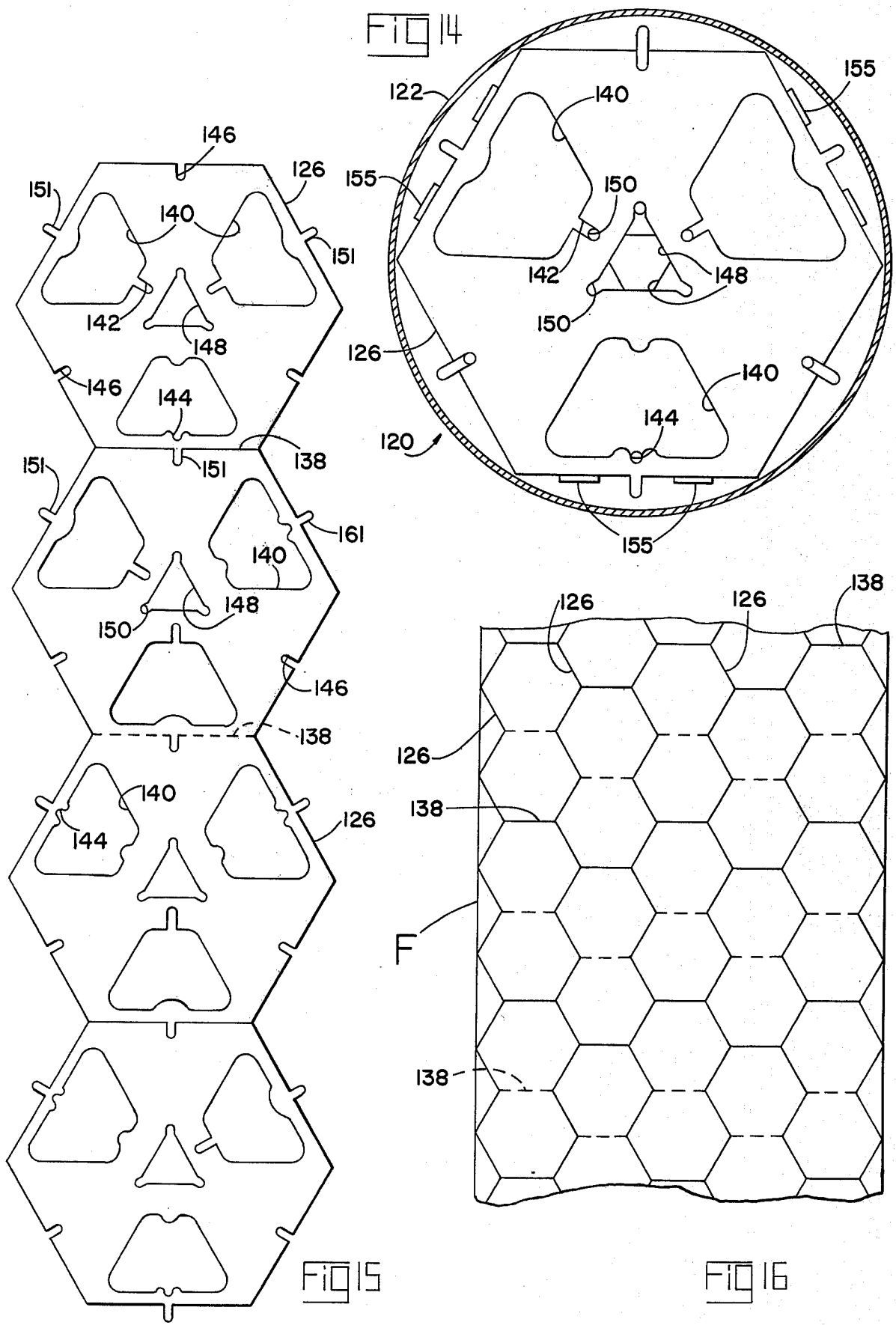

DISPOSABLE FLUID FILTERS

The present application is a continuation-in-part of my copending application Ser. No. 865,544 filed Dec. 29, 1977 now abandoned.

The present invention relates to improvements in filters of the so-called stacked disc type which remove particulate matter from fluids passed therethrough, and more particularly to disposable, or "throw-away" cartridge filters of this type.

The present invention is particularly directed towards providing a low cost, disposable oil filter for internal combustion engines. While disposable oil filters have long been used for internal combustion engines, particularly in relatively small gasoline engines for automobiles, their introduction into the market place for larger engines and Diesel engines in particular has been relatively recent. One reason for that is that, for the most part, Diesel engines require a larger volume of oil fuel flow and, in many cases, operate in an environment which requires a capacity to filter greater amounts of particulate material than in the usual gasoline engine which powers an automobile.

In this connection it should be noted that, for Diesel engines, the so-called stacked disc filter has demonstrated itself to be superior in most engine applications. A stacked disc filter is characterized by a plurality of discs of filter material assembled in stacked relation within a shell. The filter cartridge has entry posts through which oil passes to surround the exterior of the stack of filter discs. The oil then flows, by way to tortuous passageways through the stack of discs and through the thickness of the filter material to a central passageway from which the filtered oil is discharges.

Stacked disc filters are well known to those skilled in the art and have been proposed in many different forms, primarily varying in the manner in which the tortuous passageway means are formed. In usual practice, the stack of filter discs is separately assembled. That is the stack of discs is a separate sub-assembly which is held in compression by bolts or the like prior to being inserted into the cartridge shell. In some cases the filter is a disposable cartridge and in other cases the design is such that the stacks of discs is replaceable.

The primary object of the present invention is to provide an improved, disposable oil filter cartridge of the stacked disc type which is not only less expensive, but meets the functional requirements of such oil filters, particularly as are used on larger, heavy duty Diesel engines.

A further object of the invention is to provide an improved assembly of filter elements which can be economically produced and are readily assembled into the shell of a filter cartridge.

Another object of the invention is to achieve the above ends and more particularly to provide an improved filter cartridge which retains its effectiveness over a long period of use.

The foregoing objects are attained in accordance with the broader aspects of the invention by a filter cartridge comprising a shell of circular outline having an end plate which is attached to the open end of the shell and pre-loads in compression a stack of filter elements, or discs, against the bottom of the shell. The stack of filter elements is of polygonal outline and has a plurality of tortuous passageways through which the fluid flows, through the thickness of the filter elements to a central discharge passageway.

The stack of filter elements forms a sub-assembly which is preferably of hexagonal outlet for economical fabrication from a sheet of filter material. This sub-assembly is readily assembled in the shell of the cartridge and cooperates therewith to define longitudinal fluid flow passages.

Preferably, the filter discs are formed in pleated "paper doll" fashion and have apple-shaped cut outs arranged in sequential, rotated relationship to each in the stack of discs, to provide the tortuous passageways, as is more fully set forth hereinafter.

Another preferred feature is found in the provision of a compression spring between the bottom of the stacked filter discs and the bottom of the cartridge shell. This spring maintains the several filter discs in compressed relation, one against the other to prevent fluid flow therebetween as the filter material tends to compress and have a lesser thickness over an extended period of use.

The above and other related objects and features of the invention will be apparent from a reading of the following description of a preferred embodiment thereof wherein reference is made to the accompanying drawings, and the novelty thereof pointed out in the appended claims.

Figure 4:
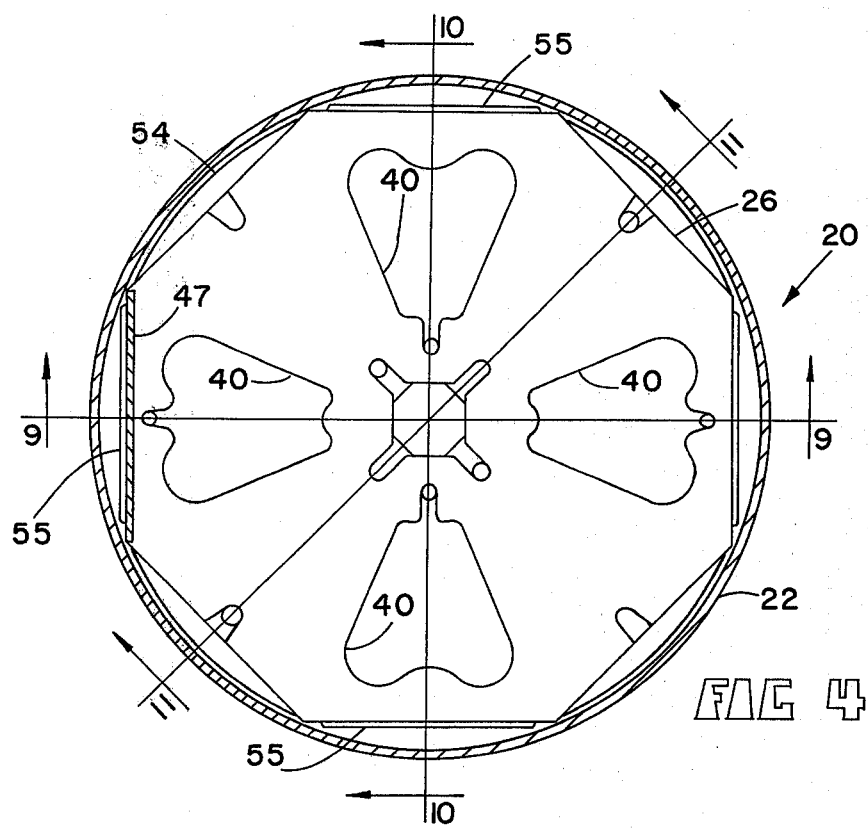
Figure 5:
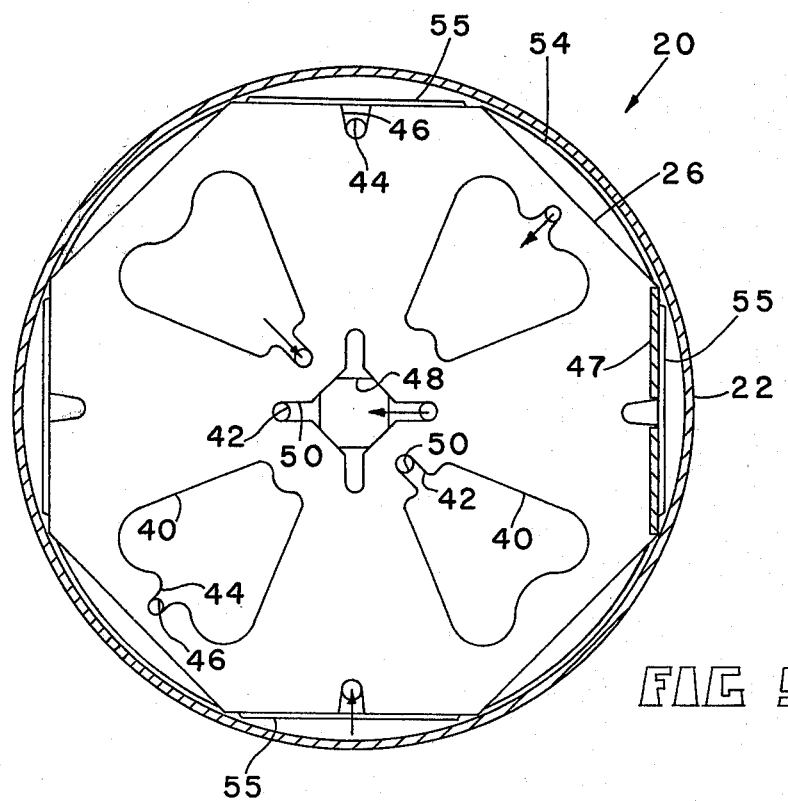
Figure 6:
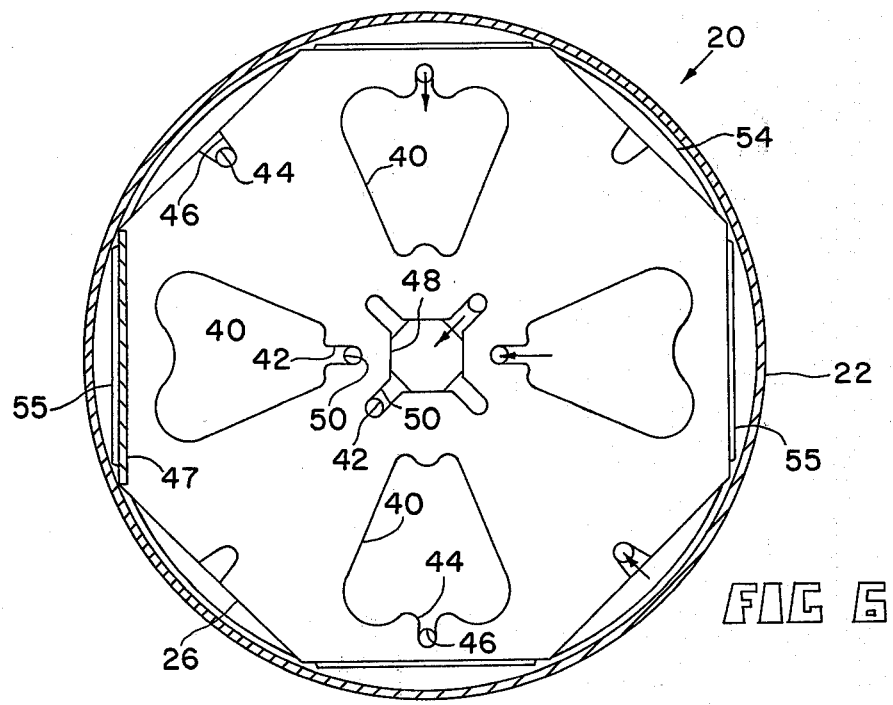
Figure 7:
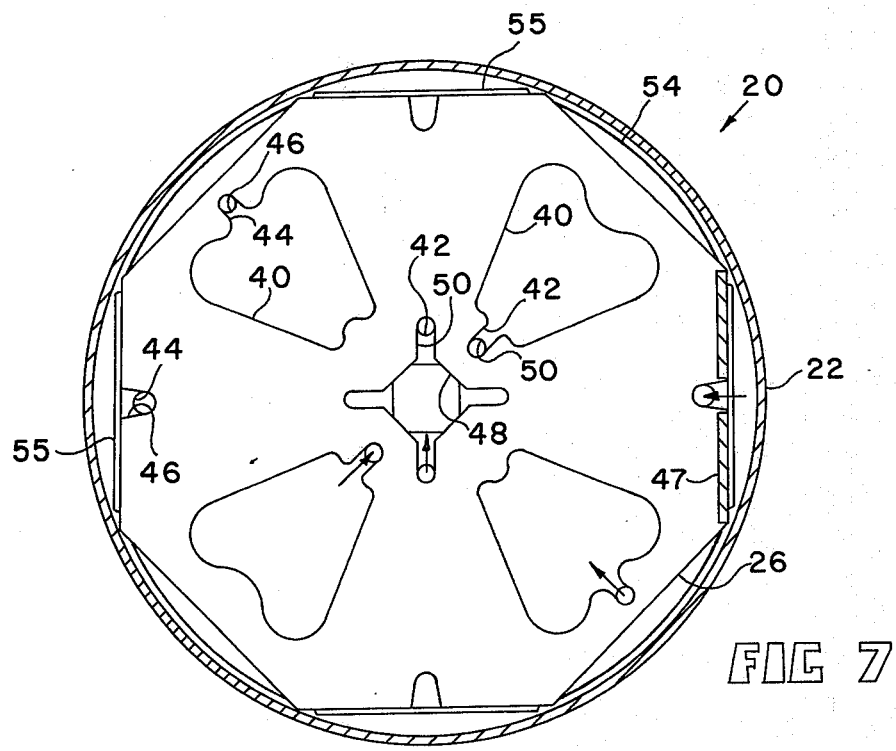

FIG. 1 is an elevation, with portions broken away and in section, of a filter embodying the present invention;
FIG. 2 is a top view of the filter seen in FIG. 1;
FIG. 3 is a section taken on line 3—3 in FIG. 1;
FIG. 4 is a section taken on line 4—4 in FIG. 1;
FIG. 5 is a section taken on line 5—5 in FIG. 1;
FIG. 6 is a section taken on line 6—6 in FIG. 1;
FIG. 7 is a section taken on line 7—7 in FIG. 1;
FIG. 8 is a view, on a reduced scale, of the filter element employed herein, in its unfolded or strip condition;
FIG. 9 is a section taken on line 9—9 in FIG. 4;
FIG. 10 is a section taken on line 10—10 in FIG. 4;
FIG. 11 is a section taken on line 11—11 in FIG. 4;
FIG. 12 is an elevation with portions broken away and in section of an alternate embodiment of the invention;
FIG. 13 is a section taken on line 13—13 in FIG. 12;
FIG. 14 is a section taken on line 14—14 in FIG. 12;
FIG. 15 is a view, on a reduced scale, of the filter element employed in the alternate embodiment of the invention, in tis unfolded or strip condition; and
FIG. 16 is a plan view, on a further reduced scale, of a sheet of filter material, illustrating the manner in which filter elements are cut therefrom.

Referencing first FIGS. 1 and 2, the disposable fluid filter cartridge of the present invention is designated by reference character 20. The general configuration of the cartridge 20 is well known and particularly adapted to be attached to the block of a Diesel internal combustion engine. When so connected, the filter cartridge becomes a part of the engine lubrication system. Oil flows to the filter cartridge, is filtered and then discharged to the lubrication distribution system, all in a fashion well known to those skilled in the art, though varying in details from engine manufacturer and between engines of different design.

The filter cartridge 20 comprises a shell 22, an end cap 24 and a stack of filter elements 26. The end cap 24 is held in place on the outer end of the shell 22 by a sheet metal ring 28 which has a rolled rim 30 sealingly gripping the outer end of the shell 22. The filter cartridge 20 is connected to the engine block by threading a central hub 32, formed on the end cap 24, onto a pipe (not shown) provided on the engine. As this is done a gasket 34 carried by the ring 28 sealingly engages an oil cavity on the engine. Oil then flows into the cartridge 20 through ports 36 formed in the end cap 24 and fills the shell 22, surrounding the stack of filter elements 26. The stack of filter elements 26 has a plurality of tortuous passageways, later described in detail, which cause the oil to pass through the thickness of the filter elements to obtain a highly efficient filtering of the oil. The filtered oil flows to a central passageway extending lengthwise of the stack of filter elements 26 and is discharged from the cartridge 20 through the central hub 32. Oil flow through the cartridge 20 is generally indicated by arrows in FIG. 1.

The stack of filter elements 26 is initially formed as a continuous strip of die cut filter material economically formed by a rotary die cutting machine. A portion of such die cut strip is illustrated in FIG. 8. It will be seen that the individual filter elements 26 are of octagonal outline and that the individual discs are connected to each other at their adjacent sides, which sides are defined by score lines 38 which are alternately formed on opposite sides of the strip. Each of the discs 26 has four equi-angularly spaced apple-shaped openings 40 which have stems 42 and 44 alternately extending inwardly and outwardly within the confines of the disc. On the sides of the discs between the apple-shaped openings 40, inlet slots 46 are formed. Each disc 26 is also provided with a central opening 48 having four discharge slots 50 extending outwardly between the apple-shaped openings 40 and towards the inlet slots 46. It will also be seen that the pattern of openings and slots is angularly offset, or rotated, 45° from one disc 26 to the next.

From the strip of filter material formed as described, the stack of filter discs is readily assembled by folding the strip in "paper doll" fashion into a stack comprising the desired number of filter elements.

The discs, when folded into stacked relation, remain interconnected by what are, in effect, hinges 47 formed by the score lines 38, as is indicated in FIGS. 4–7. When so folded the apple-shaped openings define chambers closed at top and bottom by the filter material of the next adjacent discs. Oil flows into two of such chambers in a given disc by way of the inlet slots in the adjacent discs which are registered with the outwardly projecting "apple stems" 44. From these chambers the oil flows through the thickness of the next adjacent discs and into chambers defined by apple-shaped having inwardly projecting "stems" 42. These stems register with the discharge slots 50 formed in the next adjacent discs and provide for flow of the filtered oil to the central passageway which is compositely formed by the openings 48. The foregoing description of the tortuous flow passageways is further illustrated in FIGS. 4–7 and 9–11 wherein arrows are provided to indicate oil flow directions.

The stack of filter elements 26 is confined between plates 52 and 54 at its upper and lower ends respectively. The plate 52 has downturned tabs 53 which embrace the upper portion of the stack of filter elements on alternate sides of its octagonal configuration, thereby positioning the end plate relative to the stack. Similarly, the lower end plate 54 has upbent tabs 55 which embrace alternate sides of the lower portion of the stack to position it relative thereto.

This arrangement facilitates assembly of the stack of filter elements into the shell 22. Thus the assembly of filter elements 26 and end plates 52, 54 may simply be inverted on a fixture and will be generally stable due to the lateral stability provided by the end plate tabs and hinged connections between the individual elements 26. A shell 22 may then be simply telescoped downward over this assembly and with the other components properly in place, the rim 30 secured. When assembled, the stack is centralized within the shell 22 by the unbent portions of the end plates 52, 54 which have diameters approximating the interior diameter of the shell at the upper and lower ends as will be apparent from FIGS. 3 and 7. At the same time, from FIGS. 1 and 3, it will be noted that the downbent tabs 53 of the upper end plate 52 provide flow passageways for oil to enter the shell 22 and surround the stack of filter elements 26. In this connection it will also be seen that the end cap 24 has a downwardly projecting annular seat 56 which engages the upper end plate 52. This allows for free flow of oil through the ports 36 and at the same time seals the incoming oil from the filtered oil being discharged from the cartridge by way of the central passageway in the stack of filter elements and an opening 58 in the end plate 52 which is registered therewith.

The octagonal outline of the filter elements not only contributes to the facility of assembling the cartridge, but, in combination with the circular outline of the shell 22 forms longitudinal passageways for the flow of oil to the entrances 46 for the tortuous passageways through the filter elements. When the shell 22 is telescoped over the remaining components of the cartridge seen in FIG. 1, a relatively high compressive load is exerted to compress the filter elements, first against a spring 60 disposed between the lower end plate 54 and the recessed lower end of the shell and positioned by a cone 62 projecting downwardly from the end plate 53. This compressive load is applied until the spring bottoms and is continued to further compress the filter elements as the lower end plate 54 engages the lower end of the shell as indicated. The amount of compressive load required is well known to those skilled in the art. With the compressive load still being maintained, the assembly is then processed by a conventional seaming machine to form the crimped rim 30 on the ring 28 and secure it to the upper end of the shell 22.

Reference is next made to FIGS. 12–15 for a description of an alternate embodiment of the invention which is distinguished from the first embodiment just described, primarily by the hexagonal outline of its filter element.

Referencing FIGS. 12–14 in particular, the alternate disposable filter cartridge is identified by reference character 120 and is likewise adapted to be attached to the block of a Diesel internal combustion engine for purposes of filtering the oil of the engine. The filter cartridge 120 comprises a shell 122 and end cap 124 and a stack of filter elements 126. The end cap 124 is held in place on the outer end of the shell 122 by sheet metal ring 128 which has a rolled rim 130 similarly gripping the outer end of the shell 122. A threaded central hub 132 is formed on the end cap 124 to provide for connection of the cartridge 120 with the engine, as before. Similarly, a gasket 134 seals the oil entry connection from the engine block. Oil flows into the cartridge 120 through ports 136 formed in the end cap 128 to fill the shell 122 which surrounds the stack of filter elements 126. The stack of filter elements 126 is formed with a plurality of tortuous passageways which causes the oil to pass through the thicknesses of the filter elements, obtaining a highly efficient filtering action. The filtered oil, similarly, flows to a central passageway and is discharged from the cartridge 120 through the hub 132 as indicated by the arrows in FIG. 12.

The stack of filter elements 126 is formed from a continuous strip of die cut, individual, hexagonal filter elements which are connected to each other at their adjacent sides. These sides are defined by score lines 138, formed alternately of opposite sides of the strip, reference also FIG. 15. Each of the elements or discs 126 has three equi-angularly spaced apple-shaped openings 140, which have stems 142 or 144 projecting respectively inwardly and outwardly from the openings 140. Inlet slots 146 are formed in the sides of each disc between the openings 140. Each disc is also provided with a triangle-shaped, central opening 148 having discharge slots 150, at its corners which are registerable with the inwardly extending stems 142, of an opening 140 in an adjacent disc 126. It will be seen that in die cutting the filter discs, the inlet slots are formed by removal of a tab 151 which remains attached to the sides of the discs adjacent to the openings 140. The tabs 151 are left attached in this fashion simply to reduce the amount of scrap in fabricating the filter elements.

From such a strip of filter material, as illustrated in FIG. 15, a stack of filter elements is readily assembled by folding in "paper doll" fashion into a stack comprising the desired number of filter elements. Flow of fluid, through the filter elements 126, form the openings 146 to the central passageway comprised of the several openings 148, through the thicknesses of the discs is, in essence, the same described in connection with the stack of filter elements 26, above.

The stack of filter elements 126 is confined between plates 152 and 154 which are disposed at its upper and lower ends respectively. The plate 152 has down turned tabs 153 which engage the upper portion of the stack of filter elements on alternate sides of its hexagonal outline to thus be positioned laterally relative to the stack of filter elements. Similarly the lower end plate 154 has up bent tabs 155 which engage alternate sides of the lower portion of the stack of filter elements 126 to position it laterally of the stack.

This arrangement similarly facilitates assembly of the stack of filter elements 126 into the shell 122. Thus, for example, the stack of filter elements 126, with the end plates 152 and 154 in place may be positioned on a fixture with the plate 152 to the bottom. A spring 160 may then be positioned on top of the plate 154 and then the shell 122 telescoped downwardly over this sub assembly to compress both the filter elements 126 and spring 160. The end cap 124 may be added and held in place by the addition of the ring 128 in a similar fashion.

It will also be seen that the upper end plate 152 is provided with outwardly projecting tabs 162, which facilitate positioning of the stack of filter elements, and particularly the upper end thereof, centrally within the shell 122.

The advantages of the first filter cartridge 22, above described are likewise found in the filter cartridge 122. This is particularly to be noted in that the polygonal outline of the filter elements functions alone or in combination with the end caps 152, 154 to facilitate assembly of and in positioning the stack of filter elements within the shell 122. At the same time, the straight sides of the outline of the filter elements and the circular outline of the shell, provide flow paths for the oil to flow the several openings 146 for the tortuous passageways through the stack of filter elements, and eventually through the filtered passageways back to the engine.

A further advantage of the hexagonal outline of the filter elements 126 is that they can be more economically formed from a strip of filter material, illustratively shown in FIG. 16. This sheet of filter material is identified by reference character "F" and for representative purposes is illustrated with a width sufficient to provide five, filter element forming strips. Because of the hexagonal outline of the filter elements they may be nested so that there is no waste filler material between the strips. The only waste material form the sheet will be along its edges and, of course, the portions which have to be removed to form the openings 140.

There are several advantages to both of the above described stack of filter elements. The tortuous passageways thereby provided, in addition to being highly efficient in providing effective filtration over an extended period of time are formed in such a way that there are portions of filter material which extend in solid relationship throughout the length of the stack. That is, viewed in composite, the openings and slots do not extend over the entire area of discs, leaving structural "columns" of filter material extending lengthwise of the stack. Thus it is possible to exert a substantial compressive load on the stack to preserve the integrity of the tortuous passageways without impairing the integrity of these passageways.

Another advantage in the strip arrangement is that proper registration of the several discs is assured. Thus there is no possibility that one disc would be rotated to allow a portion of the oil to bypass the proper measure of filtration or to block oil flow through a portion of the stack of filter elements. Further, the hinge connections, between the discs, prevent lateral offset of the discs relative to each other. A further advantage of the hinged connections between adjacent discs, is that the discs are more readily maintained in stacked relationship during their assembly into the filter cartridge.

The assembly of either stack of filter elements is further facilitated by the diameter of the shell, 22 or 122, being somewhat greater at its upper end while its inner, lower end diameters approximates the maximum crosswise dimension of the filter elements. This minimizes the accuracy required in initially aligning a shell to telescope over a stack of filter elements. The shell is guided into alignment with the stack as it is telescoped thereover and, then the upper end of the stack is centralized either by the unbent portions of the end plate 52 or the tabs 162 of the end plate 152.

In each case the polygonal outline of the filter elements combines with the circular outline of the shell to define the inlet flow passages to the filter elements.

A further point to note in connection with both embodiments is that, even with the high compressive preload applied to the filter elements, they have a tendency to lose thickness during use. The spring 60 or 160 provides additional and continued compressive loading on the stack of filter elements so that even with a loss in disc thickness the filter elements are held in firm contact with each other and the integrity of the tortuous passageways maintained. The filter material itself may be any one of several available materials which are well known to be suitable for the purposes herein described.

The filter elements 26 or 126 are described as integral components of a disposable filter cartridge. However, it will be apparent that filter elements so stacked and configured could also be advantageously employed alone or in combination with the described end plates as replacements where the remaining elements of the cartridge are not to be disposed of.

While a disposable oil filter cartridge, and replacement sub assembly therefor particularly adapted for use in Diesel internal combustion engines has been described herein, it will be appreciated by those skilled in the art that filters for other application and other fluid mediums could be devised within the spirit and scope of the present inventive concepts, which are therefore to be derived from the following claims.

Having thus described the invention, what is claimed as novel and desired to be secured by Letters Patent of the United States is:

1. A disposable fluid filter cartridge comprising,
   an elongated shell of generally circular cross section having an integral closed end,
   closure means sealingly connected to the open end of said shell,
   a stack of porous filter elements disposed within said shell,
   rigid end plates at opposite ends of said stack of filter elements,
   said stack of filter elements having a polygonal outline with the corners thereof in contiguous relation with the interior of said shell, thereby defining fluid flow passageways along the length of the stack of filter discs between the sides thereof and the interior of said shell,
   said end plates having tabs extending into embracing relation with the end portions of said stack of filter elements, said tabs embracing a plurality of the polygonal sides of said stack and having edge portions engageable with the interior surfaces of said shell to laterally position said stack within said shell while providing lengthwise flow passages for the fluid,
   said stack of filter elements having, on its exterior surface, a plurality of entrances, a central discharge passageway and a plurality of tortuous passageways connecting said entrances, by way of flow through the thickness of said elements, with said central passageway,
   said closure means having at least one inlet port through which fluid passes to surround the exterior of said stack of filter elements and an outlet port in fluid communication with the central passageway of stack of filter elements for the discharge of filtered fluid from said cartridge,
   said filter cartridge being further characterized in that the closure means holds the stack of filter elements in compressed relation by engagement with one of said end plates and exerting a compressive force through said stack and the other of said end plates which engages the closed end of said shell, thereby maintaining the integrity of said tortuous passageways.

2. A disposable fluid filter cartridge as in claim 1 wherein
   the closed end of said shell is recessed and a compression spring is disposed in said recess and maintains a compressive force on said stack of filter elements to thereby maintain the integrity of the tortuous passageways therethrough as the thickness of the filter elements is reduced during use.

3. A disposable fluid filter cartridge as in claim 2 wherein
   the filter elements are interconnected one to another by a scored portion of the filter material, thereby facilitating their being maintained in stacked relation during fabrication of the filter cartridge.

4. A disposable fluid filter cartridge as in claim 3 wherein
   each filter element has a plurality of apple-shaped openings with stems extending alternately inwardly and outwardly within the outline of the filter elements, and, between said apple-shaped openings there are provided inlet slots extending inwardly from the outer perimeter of the element and discharge slots extend outwardly from a central opening which is a portion of the central discharge passageway of the stack of filter elements, said openings and slots being angularly offset from one filter element to another in the stack of filter elements to thereby form said tortuous passageways.

5. A disposable fluid filter cartridge as in claim 1 wherein
   the upper end portion of the shell has a somewhat greater diameter than its lower end portion,
   the filter elements are interconnected one to another by a scored portion of the filter material,
   whereby assembly of the filter elements into the shell is further facilitated while maintaining the filter elements centrally within the shell upon completion of such assembly.

6. A disposable fluid filter cartridge as in claim 1 wherein
   the filter elements have a hexagonal outline.

* * * * *